March 15, 1955  E. A. STACHOWSKI  2,704,050
BIRD HOLDING DEVICES
Filed June 22, 1953  2 Sheets-Sheet 1

INVENTOR.
Edwin Stachowski
BY
ATTORNEYS

March 15, 1955  E. A. STACHOWSKI  2,704,050
BIRD HOLDING DEVICES
Filed June 22, 1953  2 Sheets-Sheet 2
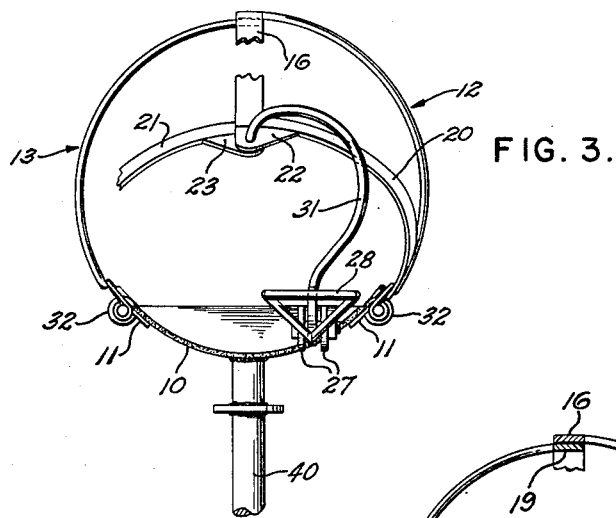
FIG. 3.
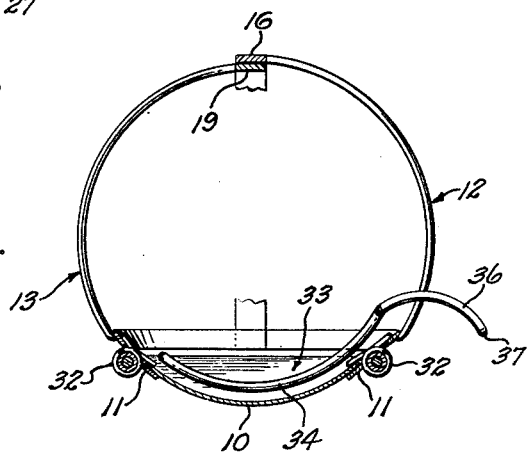
FIG. 4.
FIG. 5.
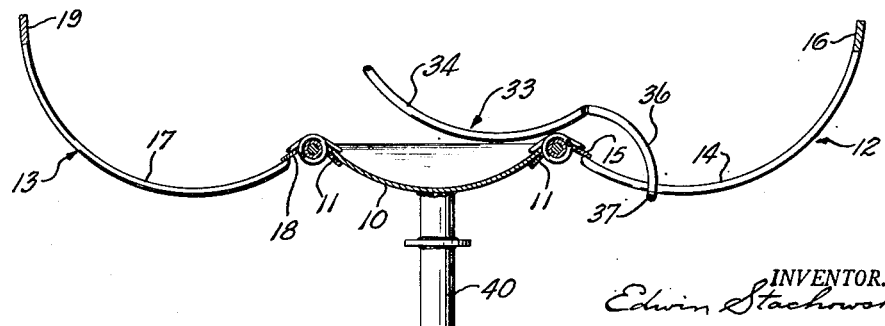
INVENTOR.
Edwin Stachowski
BY Morsell & Morsell
ATTORNEYS

United States Patent Office 2,704,050
Patented Mar. 15, 1955

2,704,050

BIRD HOLDING DEVICES

Edwin A. Stachowski, Waukesha, Wis.

Application June 22, 1953, Serial No. 363,315

4 Claims. (Cl. 119—15.6)

This invention relates to improvements in bird holding devices.

In the training of pointing bird dogs it is highly desirable to be able to simulate natural hunting conditions and to get the dog used to the normal actions of a bird in the field.

It is therefore a general object of the present invention to provide an improved bird holding device which may be employed to hide a bird, such as a pheasant or quail in a field, the device being in the form of a cage to permit scent to escape, and there being release means to provide for freeing of the bird when desired.

A further object of the invention is to provide a device as above described wherein means is provided for insuring that the bird will fly into the air, immediately upon release, instead of running along the ground.

With the above and other objects in view, the invention consists of the improved bird holding device, and all of its parts and combinations, as set forth in the claims, and all equivalents thereof.

In the accompanying drawings, illustrating one complete embodiment of the preferred form of the invention, in which the same reference numerals designate the same parts in all of the views:

Fig. 3 is a front view of the bird holding device, parts being broken away;

Fig. 4 is a sectional view taken approximately on the line 4—4 of Fig. 2 showing the device in closed condition, parts being broken away; and Fig. 5 is a view similar to Fig. 4 showing the parts in fully opened condition, and showing the bird tosser in bird elevating position.

Referring more particularly to the drawings, the numeral 10 designates a bottom, which may be in the form of a dished pan or in any other form. Secured to opposite sides of the bottom 10 are piano hinges 11. The piano hinges connect with cage-like wings 12 and 13 to hingedly connect the same to the bottom, whereby the wings are movable on the piano hinges from the closed position of Fig. 4 to the open position of Fig. 5.

Figure 1:
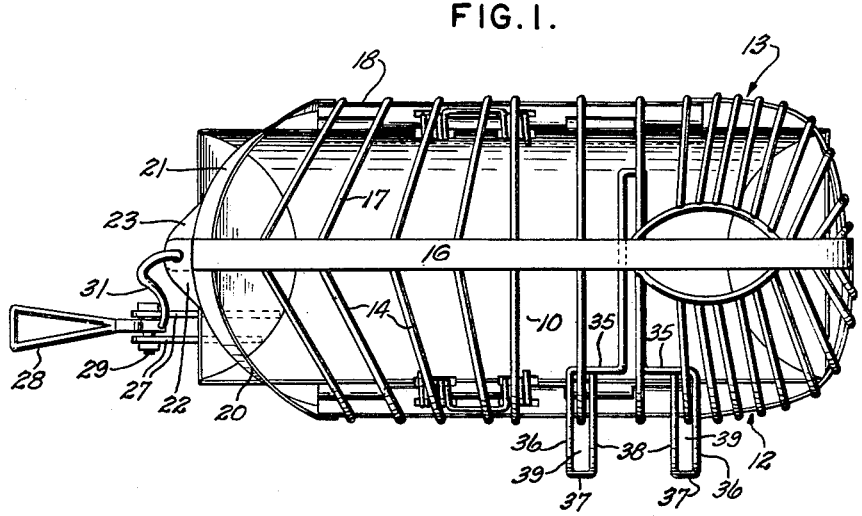
Fig. 1 is a top plan view of the bird holding device in closed condition.
Figure 2:
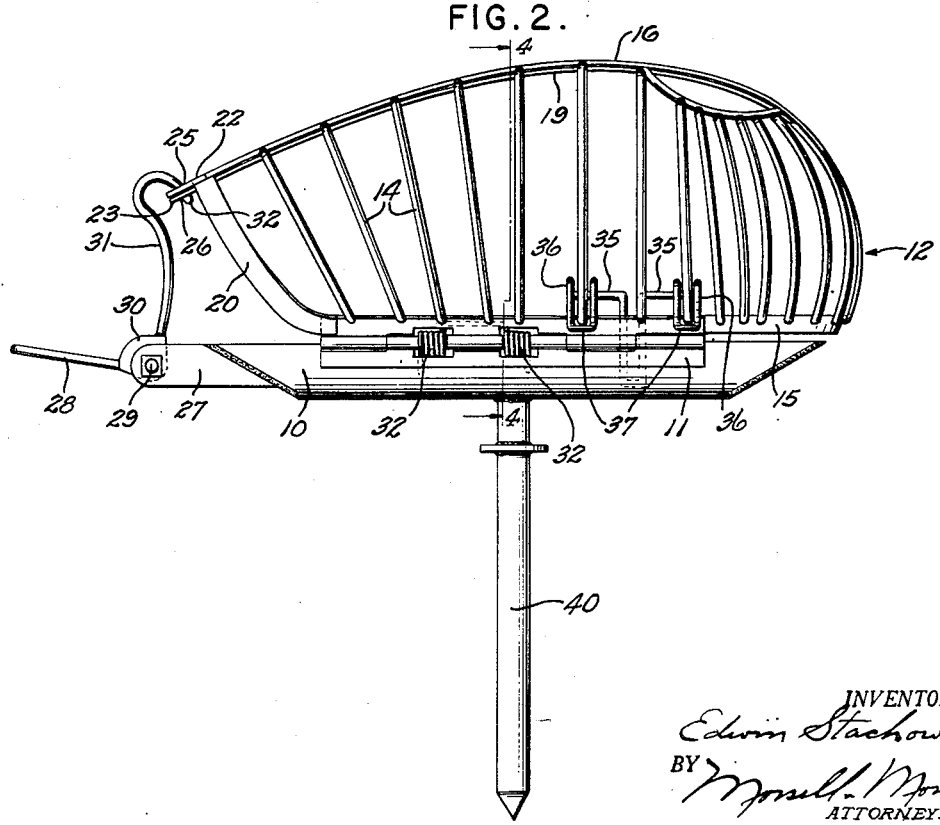
Fig. 2 is a side elevational view thereof.

The cage wings are of open construction and preferably include spaced wire bars. The wings 12 include spaced metal bars 14 having lower ends connected to a metal frame strip 15 and having their upper ends connected to a metal frame strip 16. The wing 13 is a similar in construction and includes spaced metal bars 17 having their lower ends connected to a metal frame strip 18 and having their upper ends connected to a metal frame strip 19. When the cage wings 12 and 13 are closed the frame strip 16 overlaps the frame strip 19 as shown in Fig. 4. At the front of the holder the wing 12 may have a front strip 20 to reinforce the front, and the wing 13 may have a front strip 21. Latching ears 22 and 23, which are formed with holes 25 and 26 which register when the wings are closed, project forwardly from the device as shown in Figs. 1, 2 and 3.

Projecting forwardly from the bottom member 10 is a pair of spaced bars 27. A bell crank lever which has one leg forming a release or trip lever 28 is pivotally connected between the forward ends of the bars 27 by a bolt 29. The other leg of the bell crank lever is rigidly connected to the inner end of the trip 28 by webbing 30 and is in the form of a latching hook 31 having a bent end 32. The latter is removably insertable in the holes 25 and 26 to releasably latch the wings in the closed position of Figs. 1, 2, 3 and 4 against the tension of springs 32. The latter are embodied in the piano hinges 11 and normally urge the wings toward the spread condition of Fig. 5. When the holder is closed, these springs keep tension on the wings to hold the latch hook 31 in position. When pressure is exerted on the trip lever 28 to withdraw the hook 31 from the holes 25 and 26 the springs are strong enough to quickly snap the wings 12 and 13 to the spread condition of Fig. 5.

At a suitable location intermediate the length of the holder, and normally resting on the bottom pan 10 is a bird tosser 33. It includes a concave bird engaging portion 34 which may be formed of doubled back wire as illustrated. There are also two actuating extensions which are formed by bending the ends of the wires 34 away from each other as at 35, then outwardly of the cage as at 36, then in a direction toward each other as at 37, and then in a direction inwardly of the cage as at 38. Thus, two loops 39 are provided, each of which embraces one of the wires 14 of the wing 12. The length of the loops is such that when the wing 12 is nearly open, the wires 14 which are within the loops will engage the loop ends 37 to exert a push thereon and cause sudden movement of the bird engaging portion 34 from the position of Fig. 4 to the position of Fig. 5.

In use of the device, a live bird, such as a pheasant or quail, is placed in the holder, the wings are closed, and the latch is set as in Figs. 1 to 4 inclusive. The anchoring stake 40, which projects downwardly from the base 10 is pushed into the ground in the location where it is desired to hide the caged bird. Due to the open, cage-like construction of the holder the scent of the bird can readily escape. When the dog picks up the scent he will point toward the holder. At a desired time thereafter the trip lever 28 may be stepped on. This will rock the hook 31 out of the holes 25 and 26 to release the wings 12 and 13. Due to the action of the springs 32 the wings will snap toward open position. Shortly before the wing 12 is fully opened the bars which are embraced by the loops 36 will engage the ends 37 of the loops to push downwardly thereon. This will cause the concave bird engaging portion 34 to snap up to the position of Fig. 5, pushing on the breast of the bird and making it jump into the air and start to fly immediately. This eliminates the possibility of the bird merely running out of the holder.

Various changes and modifications may be made without departing from the spirit of the invention, and all of such changes are contemplated as may come within the scope of the claims.

What I claim is:

1. In a bird holder having cage-like means for confining a bird and including at least one releasable part having side bars, a releasable latch normally holding said part in bird confining position, means for urging said releasable part to releasing position when said latch is operated to free said part, a movable bird tossing member in said holder, and means including spaced outwardly projecting loops connected to said tossing member through each of which a bar of the releasable part extends, said loops being positioned for engagement by said bars when the releasable member is moving to releasing position for actuating said tossing member whereby a bird thereon is urged in an upward direction.

2. In a bird holder having cage-like means for confining a bird and including a dished bottom and at least one releasable cage part hinged to said bottom, a releasable latch normally holding said releasable part in bird confining position, means for urging said releasable part to releasing position when said latch is operated to free said part, a movable rigid bird tossing member having a concave lever portion terminating in a free end normally positioned in said dished bottom and having an actuating extension positioned for engagement by said releasable part when the latter is moving toward releasing position for actuating said concave lever portion whereby a bird thereon is urged in an upward direction.

3. In a bird holder having cage-like means for confining a bird and including at least one releasable part having a side bar which extends transversely of its width, a releasable latch normally holding said part in bird confining position, means for urging said releasable part to releasing position when said latch is operated to free said part, a rigid movable bird tossing member in said holder having a lever portion terminating in a free end which is normally positioned at the bottom of the cage and having an actuating part extending transversely of said side bar and projecting through the releasable part and having an external abutment end, said abutment end being positioned for engagement by said bar when the releasable part is moving toward releasing position to rock said lever portion in an upward direction whereby a bird thereon is tossed upwardly.

4. In a bird holder having cage-like means for confining a bird and including a dished bottom and at least one releasable cage part hinged to said bottom, a releasable latch normally holding said releasable part in bird confining position, means for urging said releasable part to releasing position when said latch is operated to free said part, a rigid movable bird tossing member having a concave lever portion terminating in a free end which is normally positioned in said dished bottom and having an integral actuating extension which projects through said releasable cage part and which has an external abutment end positioned for engagement by said cage part when the latter is moving toward releasing position to actuate said concave lever portion and throw a bird thereon in an upward direction.

References Cited in the file of this patent

UNITED STATES PATENTS

| 654,947 | Champlin | July 31, 1900 |
| 2,504,763 | Voecks | Apr. 18, 1950 |
| 2,642,036 | Stuart | June 16, 1953 |

FOREIGN PATENTS

| 23,623 | Great Britain | 1900 |
| 339,422 | France | June 9, 1904 |
| 264,110 | Italy | Apr. 15, 1929 |